US009933049B2

(12) United States Patent
Kimes

(10) Patent No.: US 9,933,049 B2
(45) Date of Patent: *Apr. 3, 2018

(54) VEHICLE DRIVE SYSTEM INCLUDING A TRANSMISSION

(71) Applicant: Means Industries, Inc., Saginaw, MI (US)

(72) Inventor: John W. Kimes, Wayne, MI (US)

(73) Assignee: Means Industries, Inc., Saginaw, MI (US)

( * ) Notice: Subject to any disclaimer, the term of this patent is extended or adjusted under 35 U.S.C. 154(b) by 462 days.

This patent is subject to a terminal disclaimer.

(21) Appl. No.: 14/037,430

(22) Filed: Sep. 26, 2013

(65) Prior Publication Data

US 2014/0100071 A1    Apr. 10, 2014

Related U.S. Application Data

(60) Provisional application No. 61/709,365, filed on Oct. 4, 2012.

(51) Int. Cl.
*F16H 3/72* (2006.01)
*B60K 1/02* (2006.01)
(Continued)

(52) U.S. Cl.
CPC .............. *F16H 3/725* (2013.01); *B60K 1/02* (2013.01); *B60K 6/365* (2013.01); *B60K 6/383* (2013.01); *B60K 6/445* (2013.01); *B60L 11/123* (2013.01); *B60L 11/14* (2013.01); *B60L 15/2054* (2013.01); *F16H 3/728* (2013.01);
(Continued)

(58) Field of Classification Search
CPC ... B60K 6/26; B60K 6/36; B60K 6/42; B60K 6/46; B60K 6/365; B60K 6/543; B60K 1/02; B60K 6/383; B60K 6/445; B60L 11/02; B60L 11/04; B60L 11/10;
(Continued)

(56) References Cited

U.S. PATENT DOCUMENTS 4,050,560 A     9/1977  Torstenfelt
5,052,534 A    10/1991  Gustin et al.
(Continued)

OTHER PUBLICATIONS

Search Report and Written Opinion; International application No. PCT/US2013/062793; dated Mar. 6, 2014.
(Continued)

*Primary Examiner* — Jacob S. Scott
*Assistant Examiner* — Tinh Dang
(74) *Attorney, Agent, or Firm* — Warner Norcross & Judd LLP

(57) ABSTRACT

A vehicle drive system including a transmission has a gear set with first, second, third and fourth elements. The second element connects with an output shaft of the transmission. The system has a transmission housing and a first electric motor having an output shaft connecting with the first element for driving the first element in response to a first electrical signal. A second electric motor has an output shaft connecting with the fourth element for driving the fourth element in response to a second electrical signal. The motors operate together to cause transmission ratios to change steplessly through an infinite number of ratios between maximum and minimum values.

17 Claims, 6 Drawing Sheets

| Gear | Ratio |
|------|-------|
| 1st  | 2.743 |
| 2nd  | 1.539 |
| CVT  | 1.5:1 to 1:1 |
| Rev  | 2.743 |

(51) Int. Cl.
*B60K 6/383* (2007.10)
*B60K 6/365* (2007.10)
*B60L 15/20* (2006.01)
*B60L 11/14* (2006.01)
*B60K 6/445* (2007.10)
*B60L 11/12* (2006.01)
*F16H 3/66* (2006.01)
*F16H 37/10* (2006.01)

(52) U.S. Cl.
CPC ....... *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2270/142* (2013.01); *B60L 2270/145* (2013.01); *B60Y 2400/405* (2013.01); *B60Y 2400/421* (2013.01); *F16H 3/663* (2013.01); *F16H 2037/103* (2013.01); *Y02T 10/6217* (2013.01); *Y02T 10/6239* (2013.01); *Y02T 10/645* (2013.01); *Y02T 10/648* (2013.01); *Y02T 10/7005* (2013.01); *Y02T 10/7077* (2013.01); *Y02T 10/7241* (2013.01); *Y02T 10/7275* (2013.01)

(58) Field of Classification Search
CPC .... B60L 11/123; B60L 11/14; B60L 15/2054; F16H 3/725; F16H 3/728
See application file for complete search history.

(56) References Cited

U.S. PATENT DOCUMENTS

| | | | |
|---|---|---|---|
| 5,206,573 A | 4/1993 | McCleer et al. | |
| 5,231,265 A | 7/1993 | Hackett et al. | |
| 5,362,293 A | 11/1994 | Romanauskas | |
| 5,387,854 A | 2/1995 | McCleer et al. | |
| 5,394,321 A | 2/1995 | McCleer et al. | |
| 5,453,598 A | 9/1995 | Hackett et al. | |
| 5,638,929 A | 6/1997 | Park | |
| 5,642,009 A | 6/1997 | McCleer et al. | |
| 5,678,668 A | 10/1997 | Sink | |
| 5,847,469 A | 12/1998 | Tabata et al. | |
| 5,856,709 A | 1/1999 | Ibaraki et al. | |
| 5,918,715 A | 7/1999 | Ruth et al. | |
| 5,927,455 A | 7/1999 | Baker et al. | |
| 6,019,699 A | 2/2000 | Hoshiya et al. | |
| 6,075,302 A | 6/2000 | McCleer | |
| 6,193,038 B1 | 2/2001 | Scott et al. | |
| 6,244,965 B1 | 6/2001 | Klecker et al. | |
| 6,290,044 B1 | 9/2001 | Burgman et al. | |
| 6,306,057 B1 | 10/2001 | Morisawa et al. | |
| 6,344,008 B1 | 2/2002 | Nagano et al. | |
| 6,503,167 B1 | 1/2003 | Sturm | |
| 6,814,201 B2 | 11/2004 | Thomas | |
| 6,846,257 B2 | 1/2005 | Baker et al. | |
| 6,953,409 B2 | 10/2005 | Schmidt et al. | |
| 6,982,502 B1 | 1/2006 | Sendaula et al. | |
| 7,093,512 B2 | 8/2006 | Ibamoto et al. | |
| 7,128,680 B2 * | 10/2006 | Holmes ........................ | 475/204 |
| 7,153,228 B2 | 12/2006 | Fujiu et al. | |
| 7,198,587 B2 | 4/2007 | Samie et al. | |
| 7,201,690 B2 | 4/2007 | Miura et al. | |
| 7,223,198 B2 | 5/2007 | Kimes et al. | |
| 7,223,200 B2 | 5/2007 | Kojima et al. | |
| 7,255,186 B2 | 8/2007 | Wakuta et al. | |
| 7,256,510 B2 | 8/2007 | Holmes et al. | |
| 7,258,214 B2 | 8/2007 | Pawley et al. | |
| 7,275,628 B2 | 10/2007 | Pawley et al. | |
| 7,288,041 B2 * | 10/2007 | Bucknor .................. | B60K 6/40 475/10 |
| 7,344,010 B2 | 3/2008 | Fetting, Jr. et al. | |
| 7,349,010 B2 | 3/2008 | Bryant et al. | |
| 7,393,296 B2 | 7/2008 | Kano et al. | |
| 7,397,296 B1 | 7/2008 | Kiani | |
| 7,426,971 B2 | 9/2008 | Kano et al. | |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,507,174 B2 | 3/2009 | Raghavan et al. | |
| 7,614,466 B2 | 11/2009 | Kano et al. | |
| 7,621,359 B2 | 11/2009 | Kano et al. | |
| 7,690,455 B2 | 4/2010 | Kano et al. | |
| 7,695,387 B2 * | 4/2010 | Oba .................................. | 475/5 |
| 7,806,795 B2 | 10/2010 | Oba et al. | |
| 7,819,768 B2 * | 10/2010 | Kinugasa et al. ................. | 475/5 |
| 7,914,416 B2 | 3/2011 | Maguire et al. | |
| 7,942,781 B2 | 5/2011 | Kimes | |
| 8,040,081 B2 * | 10/2011 | Shimana ......................... | 318/34 |
| 8,465,386 B2 * | 6/2013 | Kersting ........................... | 475/5 |
| 8,888,637 B2 * | 11/2014 | Kimes ............................... | 475/5 |
| 2004/0082419 A1 * | 4/2004 | Randall ........................ | 475/149 |
| 2006/0138777 A1 | 6/2006 | Hofbauer et al. | |
| 2006/0185957 A1 | 8/2006 | Kimes et al. | |
| 2007/0056825 A1 | 3/2007 | Fetting, Jr. et al. | |
| 2007/0278061 A1 | 12/2007 | Wittkopp et al. | |
| 2008/0110715 A1 | 5/2008 | Pawley | |
| 2008/0169165 A1 | 7/2008 | Samie et al. | |
| 2008/0169166 A1 | 7/2008 | Wittkopp et al. | |
| 2008/0185253 A1 | 8/2008 | Kimes | |
| 2008/0223681 A1 | 9/2008 | Stevenson et al. | |
| 2009/0084653 A1 | 4/2009 | Holmes | |
| 2009/0098970 A1 | 4/2009 | Kimes | |
| 2009/0127059 A1 | 5/2009 | Knoblauch | |
| 2009/0133981 A1 | 5/2009 | Tarasinski et al. | |
| 2009/0142207 A1 | 6/2009 | Ring et al. | |
| 2009/0159391 A1 | 6/2009 | Eisengruber | |
| 2009/0194381 A1 | 8/2009 | Samie et al. | |
| 2009/0211863 A1 | 8/2009 | Kimes | |
| 2009/0255773 A1 | 10/2009 | Seufert et al. | |
| 2010/0200358 A1 | 8/2010 | Eisengruber et al. | |
| 2010/0230226 A1 | 9/2010 | Prout | |
| 2010/0252384 A1 | 10/2010 | Eisengruber | |
| 2011/0177900 A1 * | 7/2011 | Simon ............... | 475/5 |
| 2012/0149518 A1 * | 6/2012 | Kimes ............... | 475/5 |
| 2012/0270691 A1 * | 10/2012 | Tuckfield ............... | F16H 3/728 475/5 |

OTHER PUBLICATIONS

International Preliminary Report on Patentability; International application No. PCT/US2013/062793; dated Apr. 7, 2015.

* cited by examiner

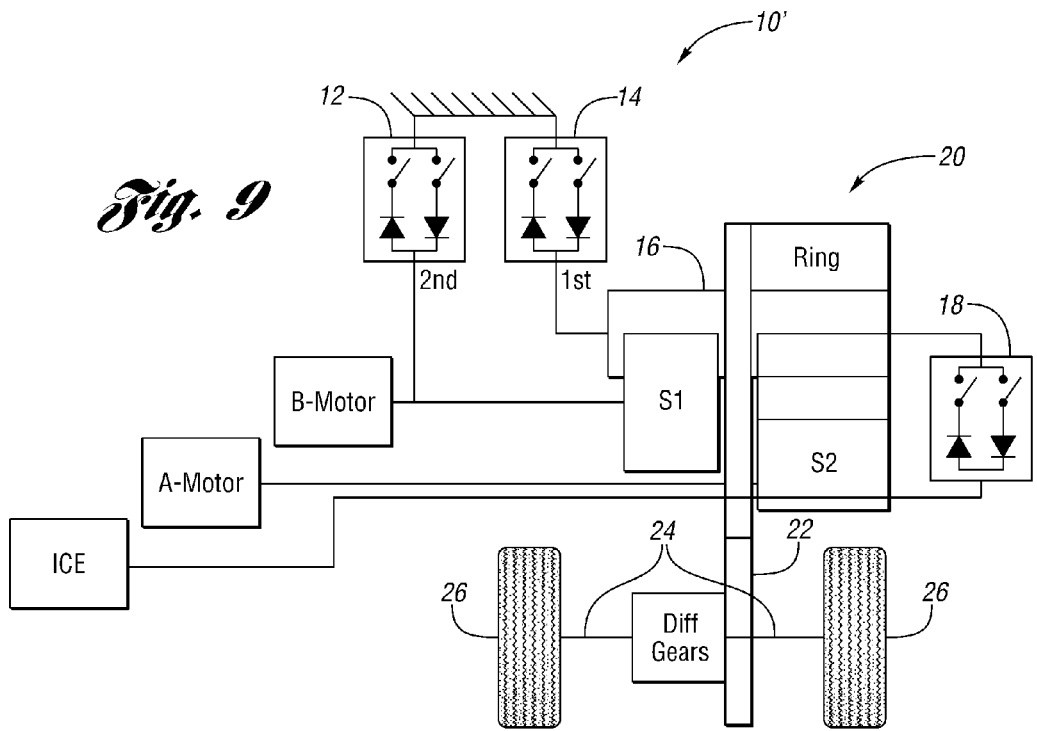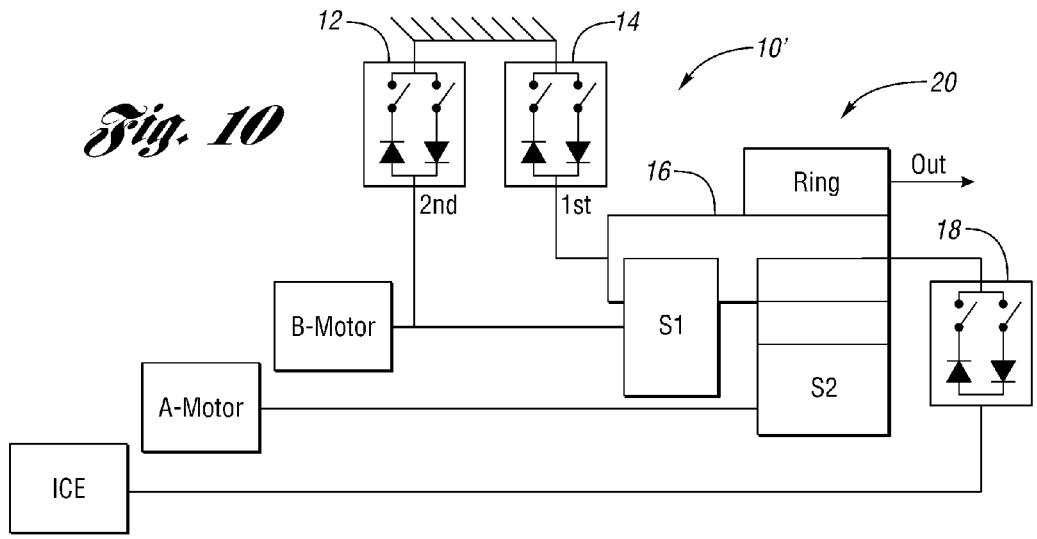

VEHICLE DRIVE SYSTEM INCLUDING A TRANSMISSION

CROSS REFERENCE TO RELATED APPLICATIONS

This application claims the benefit of U.S. provisional patent application No. 61/709,365 filed Oct. 4, 2012.

TECHNICAL FIELD

This invention relates to vehicle power trains or drive systems including transmissions with electric motors and methods and systems for controlling such drive systems.

OVERVIEW

A battery electric vehicle (BEV) is a type of electric vehicle (EV) that uses chemical energy stored in rechargeable battery packs. BEVs use electric motors and motor controllers instead of internal combustion engines (ICEs) for propulsion.

A battery-only electric vehicle or all-electric vehicle derives all its power from its battery packs and thus has no internal combustion engine, fuel cell, or fuel tank.

Vehicles using both electric motors and internal combustion engines are examples of hybrid electric vehicles, and are not considered pure or all-electric vehicles because they cannot be externally charged (operate in charge-sustaining mode) and instead they are continually recharged with power from the internal combustion engine and regenerative braking.

A plug-in hybrid electric vehicle (PHEV), plug-in hybrid vehicle (PHV), or plug-in hybrid is a hybrid vehicle which utilizes rechargeable batteries, or another energy storage device, that can be restored to full charge by connecting a plug to an external electric power source (usually a normal electric wall socket). A PHEV shares the characteristics of both a conventional hybrid electric vehicle, having an electric motor and an internal combustion engine (ICE); and of an all-electric vehicle, having a plug to connect to the electrical grid. Most PHEVs on the road today are passenger cars, but there are also PHEV versions of commercial vehicles and vans, utility trucks, buses, trains, motorcycles, scooters, and military vehicles.

A multiple-ratio (i.e., step-ratio) automatic transmission in an automotive vehicle powertrain adjusts a gear ratio between a torque source and a driveshaft to meet driveability requirements under dynamically-changing driving conditions. Ratio changes are achieved by engaging a so-called on-coming clutch ("OCC") as a so-called off-going clutch ("OGC") is released. The clutches, which may be referred to as transmission friction elements or brakes, establish and disestablish power flow paths from an internal combustion engine to vehicle traction wheels. During acceleration of the vehicle, the overall speed ratio, which is the ratio of transmission input shaft speed to transmission output shaft speed, is reduced as vehicle speed increases for a given engine throttle settling. This is an up-shift.

In the case of a synchronous up-shift, the OCC engages to lower both the gear ratio (i.e., the overall speed ratio) and the torque ratio (the ratio of output torque to input torque). The synchronous up-shift event can be divided into three phases, which may be referred to as a preparatory phase, a torque phase, and an inertia phase. The torque phase is a time period when the OCC torque is controlled to decrease toward a non-significant level with an intention to disengage it. Simultaneously, during the torque phase, the OCC is controlled to increase from a non-significant level, thereby initiating the OCC engagement according to a conventional up-shift control. The clutch engagement and disengagement timing results in a momentary activation of two torque flow paths through the gearing, thereby causing torque delivery to drop momentarily at the transmission output shaft. This condition, which can be referred to as a "torque hole," occurs before the OGC disengages. A vehicle occupant can perceive a large torque hole as an unpleasant shift shock. The preparatory phase is a time period prior to the torque phase. The inertia phase is a time period when the OGC starts to slip due to substantially reduced holding capacity, following the torque phase.

Automated manual transmission (AMT), a type of automatic shifting transmission used in motor vehicles, improves mechanical efficiency by removing the torque converter. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. During a shift of an AMT, the engine torque is disconnected from the vehicle via a clutch. The torque is interrupted while the transmission changes ratio. After the ratio is changed, the clutch reapplies connecting the engine back to the drivetrain. The problem with this approach is that during the torque interruption, the driver is lunged forward in the cab and then lunged backwards when the engine hooks back up with the drivetrain. This shift event can be as long as a second. It is an undesirable shift feel. Also the vehicle has no acceleration during this transition leading to undesirable driving situations (pulling out into traffic, merging, etc.).

Today's step ratio automatic transmissions use hydraulics to power the ratio change, dampen NVH (i.e., noise, vibration and harshness), power coupling/decoupling, and providing lubrication and cooling. This is achieved with the use of a torque converter (for coupling/decoupling power, multiplying torque, and NVH dampening), an oil pump, valve body (or hydraulic logic), and friction-type clutches (bands and frictions which are activated by hydraulics to selectively lock and release components).

Multi-Plate Friction-Type Clutches and Brakes

Clutches and brakes are used to drive or hold members of a planetary gear set, respectively. As a general rule, multi-plate clutches connect one planetary member to another. Multi-plate brakes connect a planetary member to the transmission case to hold it stationary.

The clutches and brakes consist of a number of friction discs and steel discs. The friction discs are coated with a friction material and have engaging lugs (splines) on the inner perimeter. The steel discs are steel on both sides and have engaging lugs located on the outer perimeter. The engaging lugs on the friction discs are usually engaged with a planetary member. The engaging lugs on the steel discs are usually engaged with the clutch piston housing.

In addition to the friction and steel discs, there is also an apply piston, housing and return spring. Once hydraulic fluid is applied to the clutch assembly, the piston advances and the friction and steel discs will be locked together. Once the hydraulic pressure is released, the return spring will cause the piston to return to its rest position and the friction and steel discs will be unlocked.

A band-type brake is used for some applications. The brake band is a circular band with friction material bonded to the inner surface. The band wraps around a particular planetary component (clutch drum) and locks that component to the transmission case. The brake band is applied and released by the clutch apply piston.

In order to carry out a shift in ratio, fluid needs to be applied or released from the multi-plate clutch (or brake). The following method occurs:

1. Fluid from a shift valve in the valve body is applied to the clutch assembly.

2. Fluid pressure builds behind the apply piston and overcomes the resistance from diaphragm spring.

3. The friction and steel discs are compressed together and become locked, preventing any slippage between them.

4. Two planetary members are now locked together.

5. When fluid pressure is released, the steel and friction discs are allowed to unlock.

This method has had some advantages. The power density is very high using hydraulics to clamp clutches and to multiply torque. Hydraulic systems have proven to have good dampening characteristics and smooth shift capability. It is also a natural way to lubricate the components in the transmission and to carry away heat from torque converters, pumps, gear sets, bearings, etc.

However, there are a few disadvantages. The first is efficiency. The pump is always on and pumping oil whenever the engine is running. When a friction element is turned on, power is used to maintain the clamping pressure of that friction element.

The slipping of the torque converter is also a significant source of parasitic loss and the open friction elements in the transmission provide drag and thus parasitic losses also. Another disadvantage is the complexity of these components. Clutches, pumps, torque converters, and valve bodies are among the most likely components within a transmission to have issues and thus drive warranty cost and negatively impact upon customer satisfaction. These components also tend to be the most expensive components in the transmission.

A one-way clutch (i.e., OWC) produces a drive connection (locked state) between rotating components when their relative rotation is in one direction, and overruns (freewheel state) when relative rotation is in the opposite direction. A typical one-way clutch consists of an inner ring, an outer ring and a locking device between the two rings. Two types of one-way clutches often used in vehicular, automatic transmissions include:

Roller type which consists of spring loaded rollers between the inner and outer race of the one-way clutch. (Roller type is also used without springs on some applications); and Sprag type which consists of asymmetrically shaped wedges located between the inner and outer race of the one-way clutch.

The one-way clutches are typically used in the transmission to prevent an interruption of drive torque (i.e., power flow) during certain gear shifts and to prevent engine braking during coasting. Also, there is a one-way clutch in the stator of the torque converter.

A controllable OWC is an OWC where the lock action can be turned "off" such that it freewheels in both directions, and/or the lock action can be turned "on" such that it locks in one or both directions.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

Other related U.S. patent publications include: 2012/0149518; 2011/0177900; 2010/0252384; 2009/0133981; 2009/0127059; 2009/0084653; 2009/0194381; 2009/0142207; 2009/0255773; 2010/0230226; 2010/0200358; 2009/0211863; 2009/0159391; 2009/0098970; 2008/0223681; 2008/0110715; 2008/0169166; 2008/0169165; 2008/0185253; 2007/0278061; 2007/0056825; 2006/0138777; 2006/0185957; and the following U.S. Pat. Nos. 7,942,781; 7,806,795; 7,491,151; 7,464,801; 7,349,010; 7,275,628; 7,256,510; 7,223,198; 7,198,587; 7,093,512; 6,953,409; 6,846,257; 6,814,201; 6,503,167; 6,193,038; 4,050,560; 5,638,929; 5,362,293; 5,678,668; 5,052,534; 5,387,854; 5,231,265; 5,394,321; 5,206,573; 5,453,598; 5,642,009; 6,075,302; 6,982,502; 7,153,228; and 5,918,715.

U.S. patents which describe hybrid transmissions or power trains include: U.S. Pat. Nos. 5,847,469; 5,856,709; 6,019,699; 6,306,057; 6,344,008; 7,201,690; 7,223,200; 7,255,186; 7,393,296; 7,397,296; 7,426,971; 7,614,466; 7,621,359; and 7,690,455.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY OF EXAMPLE EMBODIMENTS

An object of at least one embodiment of the present invention is to provide a vehicle drive system including a transmission having a pair of electric motors which simplifies the transmission while substantially eliminating or filling a torque hole which would normally appear during shifting thereby making shifts substantially seamless and imperceptible.

In carrying out the above object and other objects of at least one embodiment of the present invention, a vehicle drive system including a transmission is provided. The system includes a gear set including first, second, third and fourth elements, the second element connecting with an output shaft of the transmission. The system also includes a transmission housing, a first electric motor having an output shaft connecting with the first element for driving the first element in response to a first electrical signal and a second electric motor having an output shaft connecting with the fourth element for driving the fourth element in response to a second electrical signal. The motors operate together to cause transmission ratios to change steplessly through an infinite number of ratios between maximum and minimum values and to eliminate torque holes during shifting.

The system may include a non-friction controllable brake assembly having a coupling state for coupling the fourth element to the housing and an uncoupling state for uncoupling the fourth element from the housing. The brake assembly is non-hydraulically controlled to change state to maintain a desired transmission ratio.

The system may include a non-friction controllable brake assembly having a coupling state for coupling the third element to the housing and an uncoupling state for uncoupling the third element from the housing. The brake assembly is non-hydraulically controlled to change state to maintain a desired transmission ratio.

The system may include non-friction controllable first and second brake assemblies. The first brake assembly may have a coupling state for coupling the fourth element to the housing and an uncoupling state for uncoupling the fourth element from the housing. The second brake assembly may have a coupling state for coupling the third element to the housing and an uncoupling state for uncoupling the third element from the housing. The first and second brake assemblies are non-hydraulically controlled to change state to maintain a desired transmission ratio.

The first, second, third and fourth elements may comprise a first sun gear, at least one ring gear, at least one carrier and a second sun gear, respectively.

The at least one ring gear may include a pair of interconnected, distinct ring gears.

The third element may be connecting with an output shaft of an engine wherein the system may further include a non-friction clutch assembly being non-hydraulically controlled to change between a coupling state for coupling the third element to the engine output shaft and an uncoupling state for uncoupling the third element from the engine output shaft.

The at least one carrier may include interconnected carriers.

The transmission may be an automatic transmission.

The transmission may be a multi-speed, step ratio transmission having a CVT mode for automotive vehicles.

Further in carrying out the above object and other objects of at least one embodiment of the present invention, a vehicle drive system including a transmission is provided. The system includes a planetary gear set including first, second, third and fourth elements, the second element connecting with an output shaft of the transmission. The system also includes a transmission housing, a first electric motor having an output shaft connecting with the first element for driving the first element in response to a first electrical signal and non-friction controllable first and second brake assemblies. The first brake assembly has a coupling state for coupling the fourth element to the housing and an uncoupling state for uncoupling the fourth element from the housing. The second brake assembly has a coupling state for coupling the third element to the housing and an uncoupling state for uncoupling the third element from the housing. The first and second brake assemblies are non-hydraulically controlled to change state to maintain a desired transmission ratio. The system further includes a second electric motor having an output shaft connecting with the fourth element for driving the fourth element in response to a second electric signal. The motors operate together to cause transmission ratios to change steplessly through an infinite number of ratios between maximum and minimum values and to eliminate torque holes during shifting.

The first, second, third, and fourth elements may comprise a first sun gear, a ring gear, a carrier and a second sun gear, respectively. The transmission may be an automatic transmission. The transmission may be a multi-speed, step ratio transmission having a CVT mode for automotive vehicles.

Still further in carrying out the above object and other objects of at least one embodiment of the present invention, a vehicle drive system including a transmission is provided. The system includes a planetary gear set including first, second, third and fourth elements, the second element connecting with an output shaft of the transmission and the third element connecting with an engine output shaft. The system also includes a transmission housing, a first electric motor having an output shaft connecting with the first element for driving the first element in response to a first electrical signal and a second electric motor having an output shaft connecting with the fourth element for driving the fourth element in response to a second electrical signal. The motors operate together to cause transmission ratios to change steplessly through an infinite number of ratios between maximum and minimum values and to eliminate torque holes during shifting. The system further includes a non-friction controllable clutch assembly being non-hydraulically controlled to change between a coupling state for coupling the third element to the engine output shaft and an uncoupling state for uncoupling the third element from the engine output shaft.

The system may further include a non-friction controllable brake assembly having a coupling state for coupling the fourth element to the housing and an uncoupling state for uncoupling the fourth element from the housing. The brake assembly is non-hydraulically controlled to change state to maintain a desired transmission ratio.

The system may further include a non-friction controllable brake assembly having a coupling state for coupling the third element to the housing and an uncoupling state for uncoupling the third element from the housing. The brake assembly is non-hydraulically controlled to change state to maintain a desired transmission ratio.

The system may further include non-friction controllable first and second brake assemblies. The first brake assembly has a coupling state for coupling the fourth element to the housing and an uncoupling state for uncoupling the fourth element from the housing. The second brake assembly has a coupling state for coupling the third element to the housing and an uncoupling state for uncoupling the third element from the housing. The first and second brake assemblies are non-hydraulically controlled to change state to maintain a desired transmission ratio.

The first, second, third and fourth elements may comprise a first sun gear, at least one ring gear, at least one carrier and a second sun gear, respectively.

The transmission may be an automatic transmission. The transmission may be a multi-speed, step ratio transmission having a CVT mode for automotive vehicles.

The gear set may be a planetary gear set such as a Ravigneaux, modified Ravigneaux or Simpson gear set.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 9 is a view similar to the view of FIG. 6 showing the drive system in a front wheel drive, plug-in hybrid electric vehicle (PHEV) configuration;

FIG. 10 is a view similar to the view of FIGS. 6 and 9 showing the drive system in a front wheel drive, plug-in hybrid electric vehicle (PHEV) configuration.

DESCRIPTION OF EXAMPLE EMBODIMENT

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
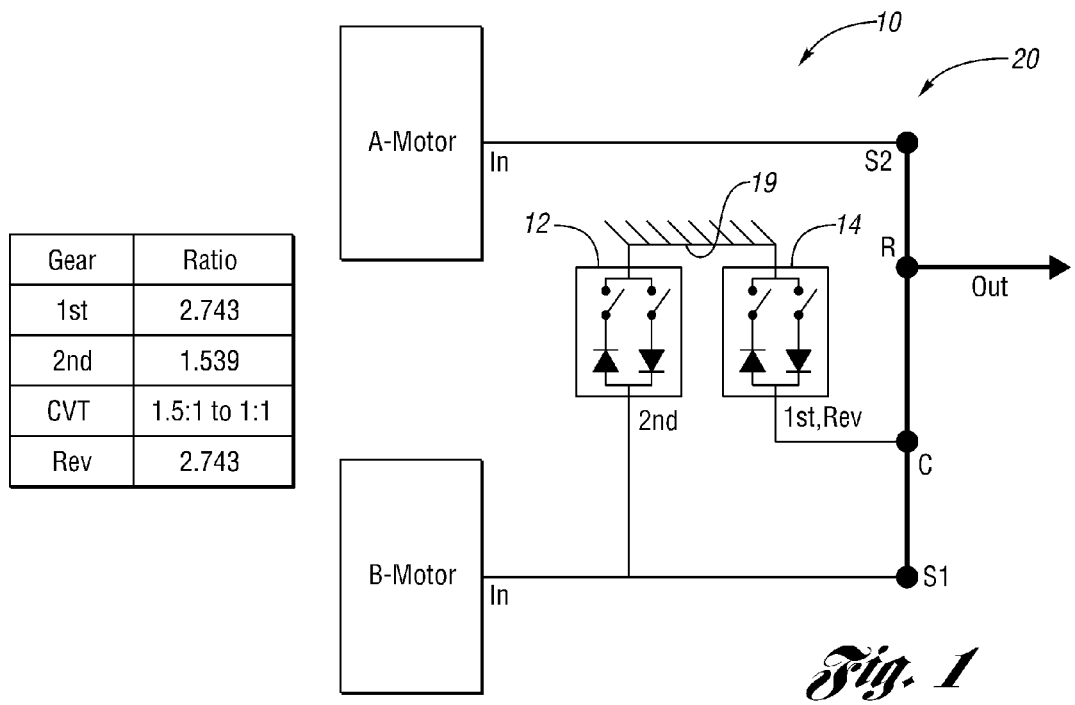
FIG. 1 is a schematic view of an electric vehicle drive system including a transmission with a pair of electric motors and includes a lever diagram and a corresponding gear/ratio table.
Figure 6:
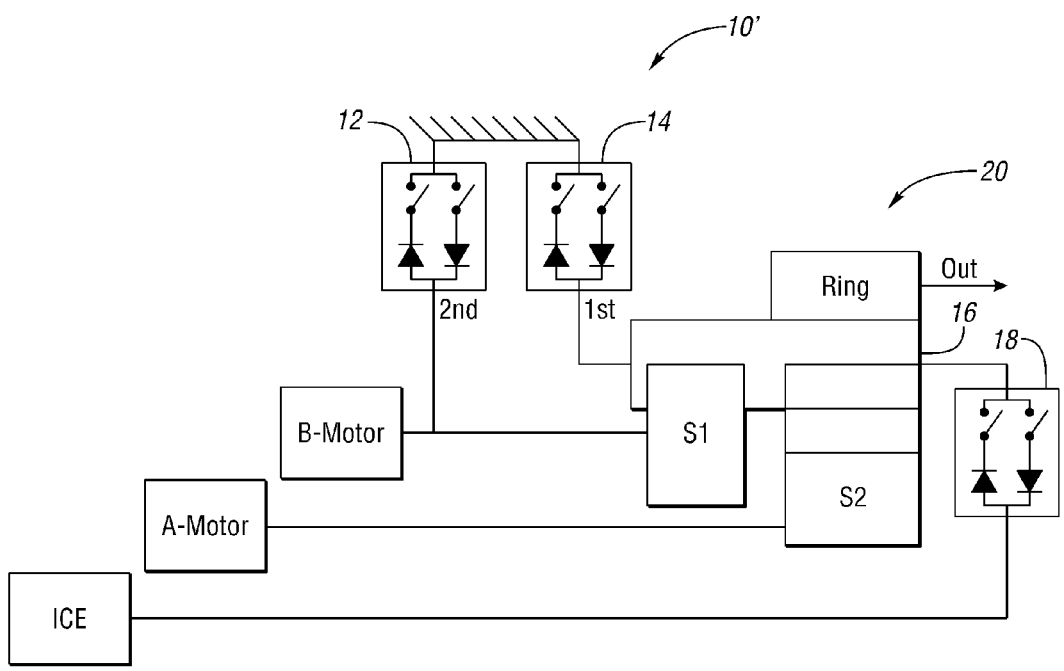
FIG. 6 is a view similar to the view of FIG. 5 showing the drive system is a rear wheel drive, plug-in hybrid electric vehicle (PHEV) configuration.

FIG. 1 is a schematic view, of a vehicular drive system including a transmission, and a pair of electric motors constructed in accordance with at least one embodiment of the present invention. The transmission 10 includes a pair of static, controllable two-way clutches 12 and 14. In a second embodiment (FIGS. 6, 9, and 10), a transmission 10' includes the clutches 12 and 14 as well as a dynamic controllable two-way or disconnect clutch 18. The clutches 12 and 14 can be conventional two-way clutches generally available from Means Industries of Saginaw, Mich. The clutch 18 is preferably generally of the type shown in U.S. Patent Publication 2010/0252384.

FIG. 1 includes a lever diagram and a corresponding gear/ratio table which corresponds to the transmission 10. The transmission 10 includes a first electric drive motor (A-Motor) the controllable or selectable one-way clutches 12 and 14 and a second electric drive motor (B-Motor). The clutches 12 and 14 are brake clutches since one of the coupling members of each of the clutches 12 and 14 is fixed to the transmission housing 19 so as not to rotate. The clutch 18 of the second embodiment is a dynamic clutch wherein both of its coupling members are free to rotate relative to each other. The second drive motor (i.e. B-motor) provides a second motor to the power flow and eliminates a dynamic third gear clutch as shown in published U.S. patent Application 2012/0149518, thereby making the transmission 10 less complicated.

A main controller (not shown) typically includes motor and engine controls or control logic which, in turn, performs a number of control functions including a transmission control algorithm. The main controller directly controls the brake clutches 12 and 14 as well as a solenoid controller which may be "onboard" the clutch 18 together with a solenoid. Each coupling assembly 12 and 14 changes between its locked mode and its overrun mode in response to a control signal directly from the main controller. The solenoid controller controls the coupling assembly 18 in response to a control signal from the main controller. Control algorithms for the clutches 12, 14 and 18 are portions of the overall transmission control algorithm.

The transmission 10 (as well as the transmission 10') includes a double planetary gear set, generally indicated at 20, comprising four members of the Ravigneaux type. The gear set 20 includes a basic gear set whose planet carrier carries a first set of planet pinions meshing with a second set of planet pinions (collectively, C or 16) a first sun gear, S1, a second sun gear, S2, and a ring gear, R.

Figure 2:
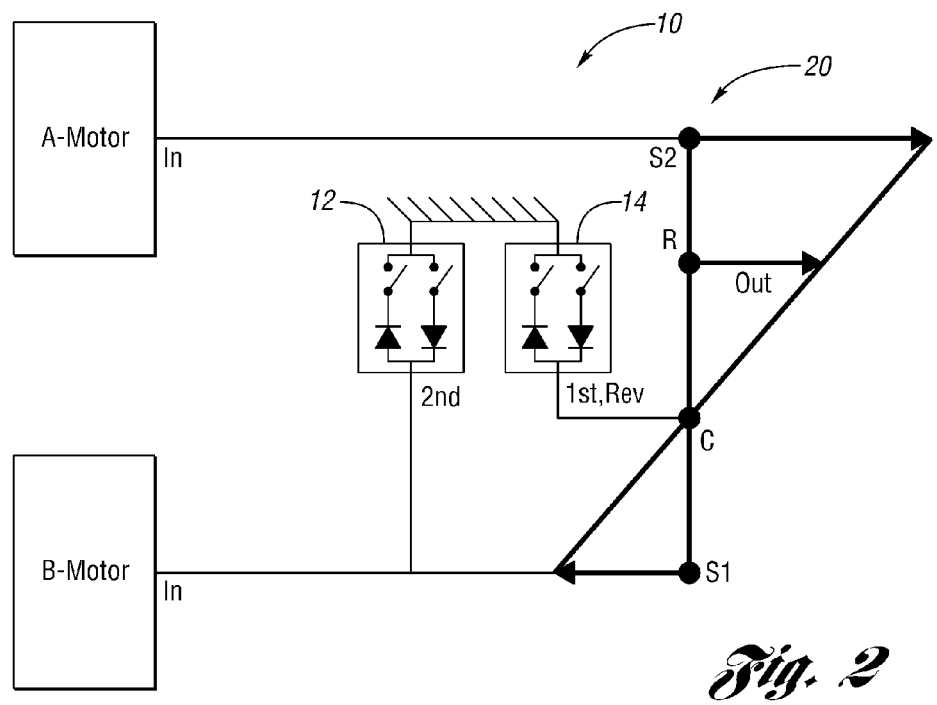
FIG. 2 is a view similar to the view of FIG. 1 showing operation in first gear where a motor A runs forward and motor B runs backward; both motors are additive to the output and react about carrier C.
Figure 3:
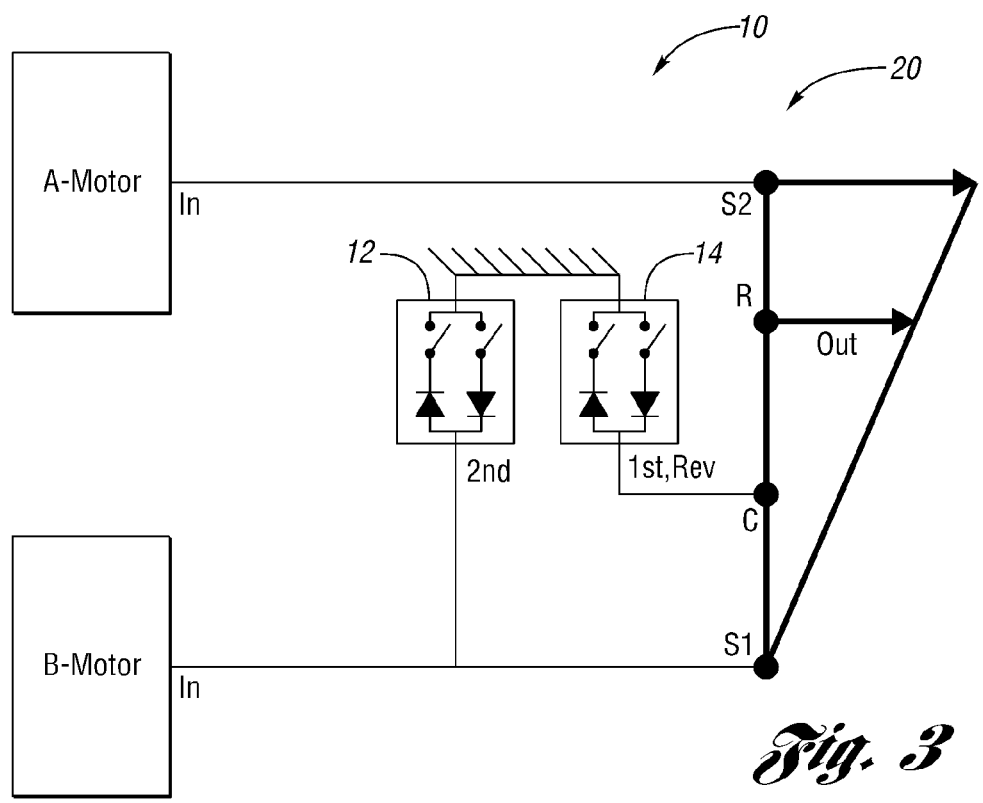
FIG. 3 is a view similar to the views of FIGS. 1 and 2 showing operation in second gear wherein motor A runs alone; the power requirement is less in second gear and therefore motor A is sufficient; motor B is off and grounded.
Figure 4:
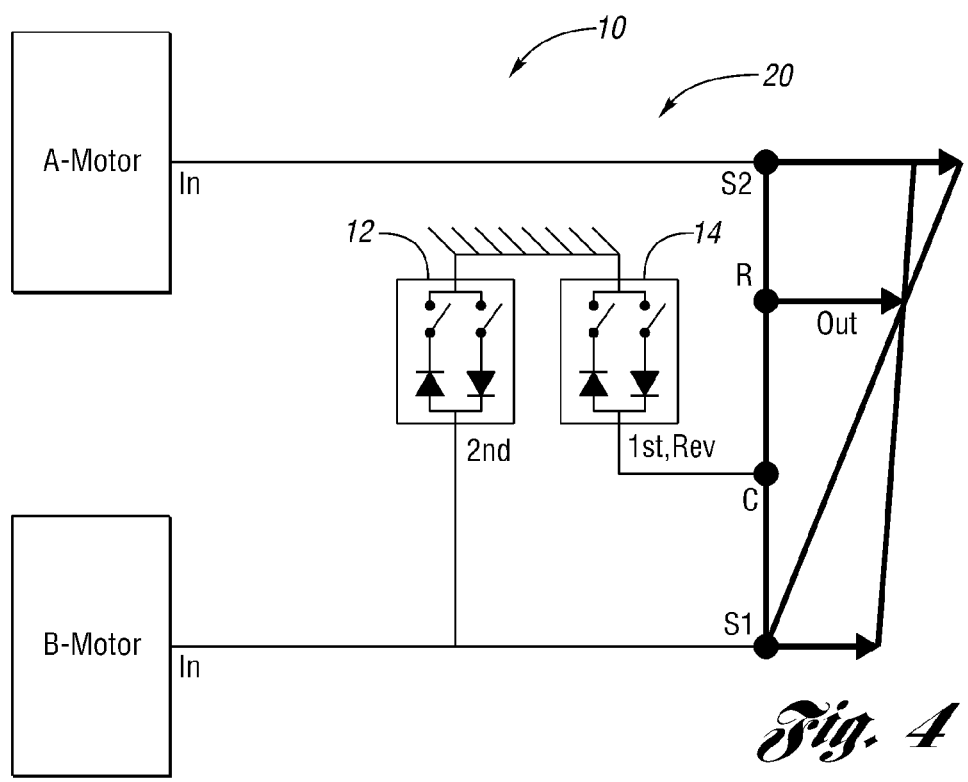
FIG. 4 is a view similar to the view of FIG. 3 showing operation in second gear which both motor A and motor B are on; as motor A speeds the vehicle up and starts to spin so fast that it starts to become less efficient; motor B starts up and the transmission becomes a CVT from second gear (i.e. 1.53:1) to direct drive (i.e. 1:1)

In the first embodiment, the four torque transmitting members C, S1, S2 and R are associated with the two electric motors, the brake clutches 12 and 14 and an output shaft of the transmission 10. The second sun gear, S2, is driven by the A-Motor. The ring gear, R, is fixed for rotation with the output shaft. The member, C, is associated with the brake clutch 14. The fourth member, S1, is associated with the brake clutch 12 and the B-motor. As shown in FIG. 2 (wherein motor A and/or motor B operate), in first gear motor A runs forward and motor B runs backward and both motors are additive to the output. Both motors react about C.

In first gear, the A motor drives the member, S2, according to the low reduction ratio of the gear set 20 with the brake clutch 14 engaged thereby holding member C against rotation.

In second gear, the A-Motor drives the member, S2, according to the intermediate reduction ratio of the gear set 20 with the brake clutch 12 engaged thereby holding member S1 against rotation. The A motor runs alone since the prior requirement is less in second gear (i.e. motor A is sufficient). Motor B is off and grounded In second gear, as the A-motor speeds the vehicle up and starts to spin so fast that it starts to run less efficient, motor B starts up and the transmission is a CVT from second gear to direct drive (1:1).

In reverse drive, the clutch 14 is engaged. S2 is driven backwards by the A-Motor thus driving the ring gear output backwards.

As described above, while simpler than the prior art, the power flow described above maintains a fixed first and second gear ratio and adds a CVT made for highway speeds running at 1:1. Equally, if not more important, this power flow eliminates any torque hole during shifting. Both motors operate to CVT between fixed ratios. Once the desired ratio is achieved, the clutches 12 and 14 latch that ratio. Consequently, the shifts are seamless and imperceptible. Furthermore, the above-described power flow has a park and hill hold function.

Using two electric motors instead of a single electric motor allows for smaller electric motors and lower power requirements for a given electric motor without any detriment to towing and performance.

Figure 5:
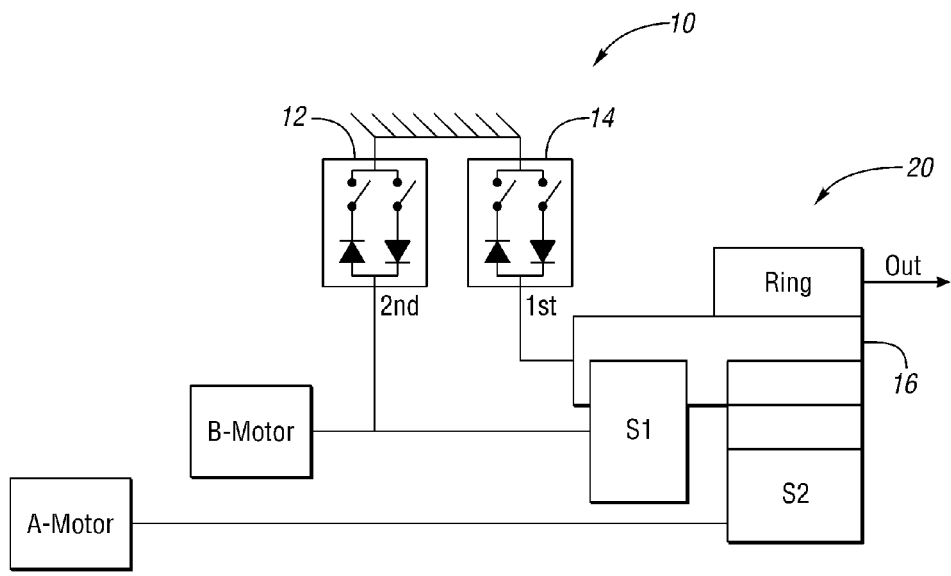
FIG. 5 is a view similar to the views of FIGS. 1-4 showing the drive system in a rear wheel drive electric vehicle configuration.

The transmission can be packaged as a rear wheel drive (RWD) (FIGS. 5 and 6) or a front wheel drive (FWD) (FIGS. 7-10) and can still be easily adapted to a PHEV (FIGS. 6, 9 and 10) with the addition of the disconnect clutch 18 of the transmission 10'. The clutch 18 connects to a gas or internal combustion engine (ICE).

Figure 7:
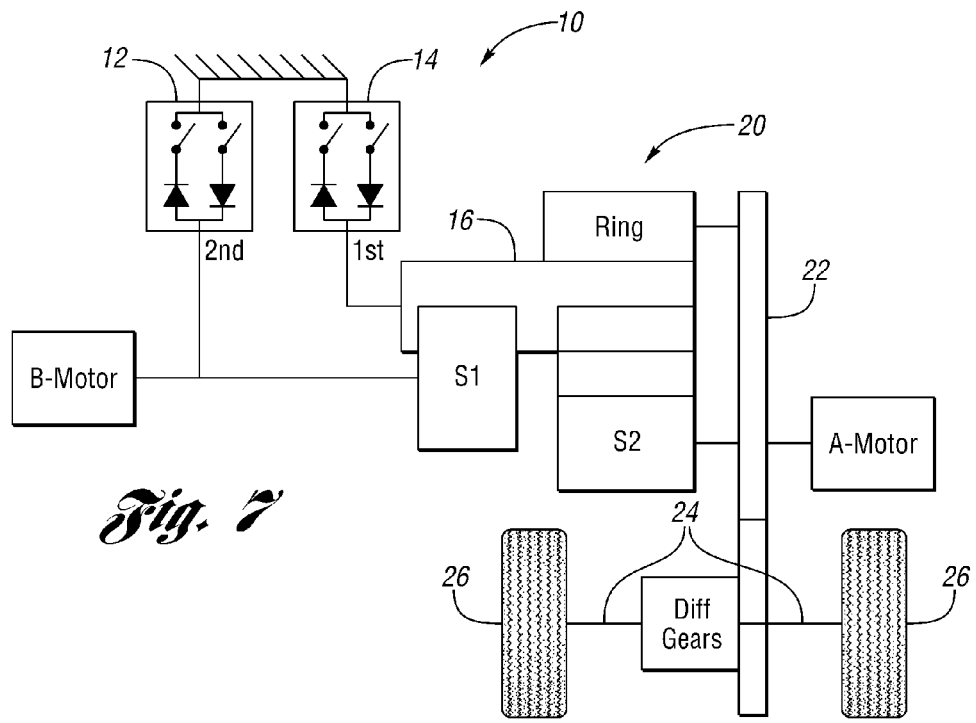
FIG. 7 is a view showing the drive system is a front wheel drive electric vehicle configuration.
Figure 8:
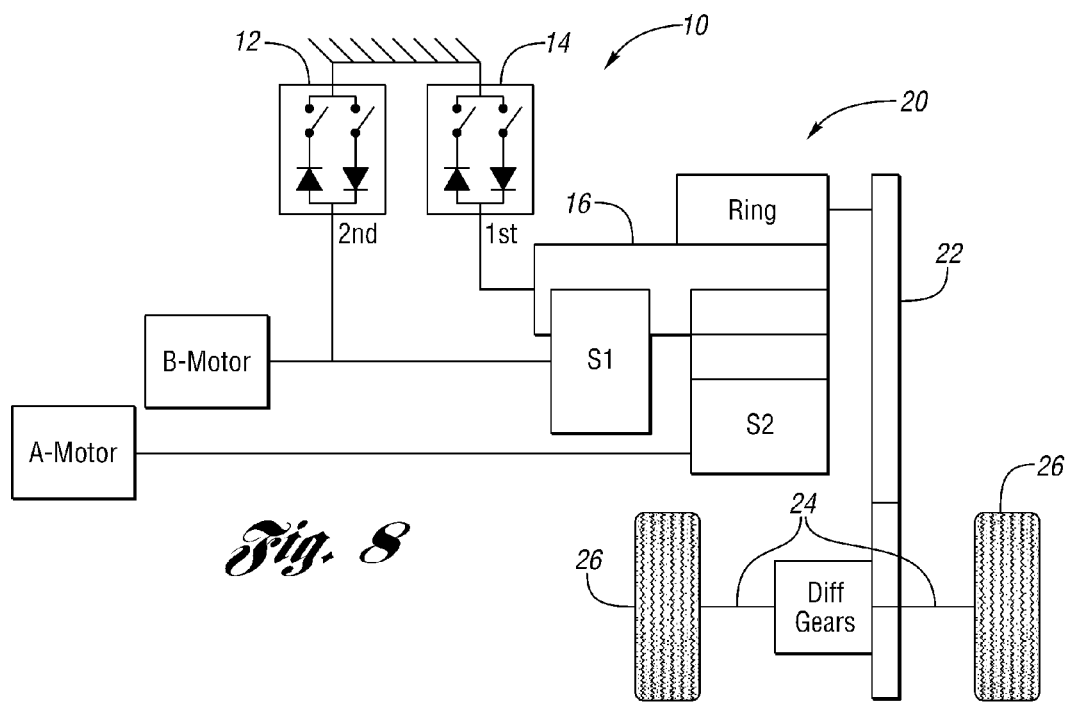
FIG. 8 is a view showing the view system in a second front wheel drive electric vehicle configuration.

FIGS. 7, 8 and 9 show the transmission 10 or 10' with transfer gear-final drive 22, a pair of half shafts 24, differential gears and tires 26 coupled to the half shafts 24.

Figure 11:
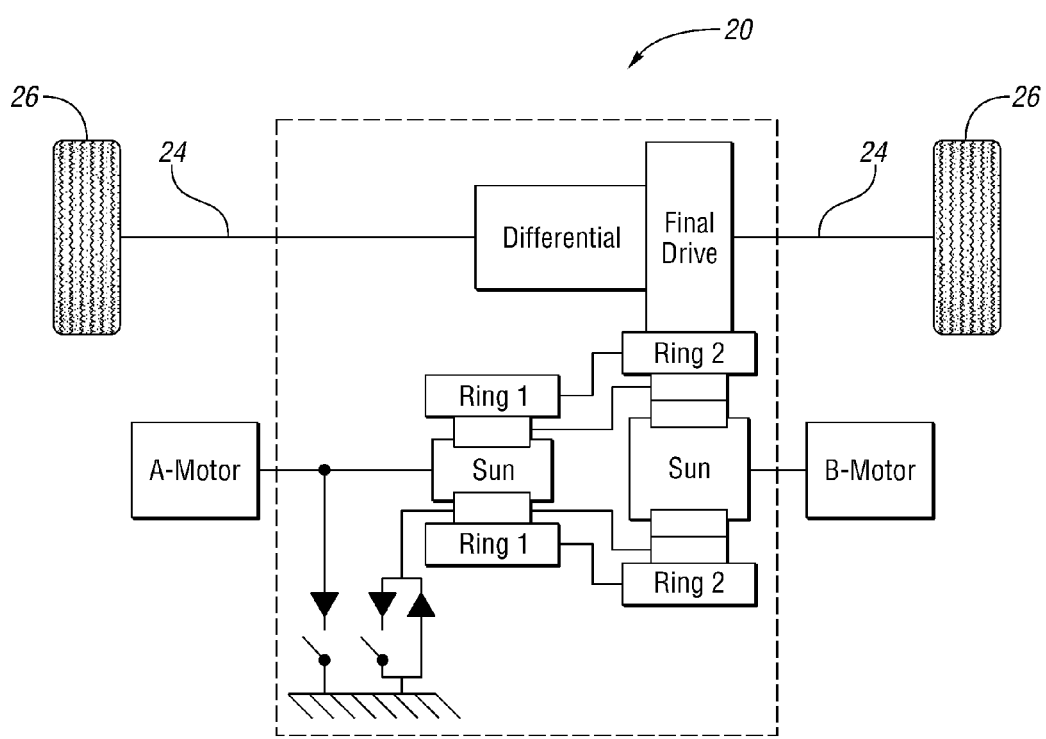
FIG. 11 is a view similar to the views of FIGS. 7-9 but showing simple and compound planetary gear sets with interconnected ring gears and carriers.

FIG. 11 shows yet another vehicle drive system including a transmission with a pair of electric motors and a pair of brake clutches (i.e. mechanical diodes) which are controlled to selectively ground various elements of the illustrated gear set to the housing of the transmission. The drive system has a discreet first gear ratio that is the same for both motors. In other words, if Motor A multiplies torque by 3.25, Motor B also multiplies torque by 3.25. This is done by ensuring R1/S1=R2/S2. If R is the same for both S1 and S2, then S1=S2 for the ratios to work.

Two distinct ring gears are connected in FIG. 10. The equation R1/S1*K/K=R2/S2 such that multiplying R1/S1 by K/K yields an integer value for R2 and S2. The step is around 2. The transmission goes from a fixed ratio of 3.2 and CVTs to second over a significant amount of time. One can lock in the second gear ratio and drive with just a single motor or the transmission can continue to CVT toward 1:1 as vehicle speed increases.

The two motors are substantially identical and are summed in first gear substantially identically. One can have a modified Ravigneaux gear set that would have one carrier, two distinct ring gears and sun gears. Or one could have the gear set 20 of FIG. 11 which includes a simple planetary (3 to 5 pinions pending torque requirements . . . scalable) and a compound planetary (double pinion with either 3 or 4 pairs of gears) and connect the ring gears and connect the carriers to achieve the same power flow.

Alternatively, the gear set may be a Simpson gear set or other type of gear set which may be represented by a 4 node lever diagram. The Simpson gear set may be more efficient with less mesh loss than the above-described gear sets.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle drive system including a transmission, the system comprising:
a gear set including first, second, third and fourth elements, the second element connecting with an output shaft of the transmission;
a transmission housing;
a first electric motor having an output shaft connecting with the first element for driving the first element in response to a first electrical signal;
a second electric motor having an output shaft connecting with the fourth element for driving the fourth element in response to a second electrical signal wherein the motors are actuatable to cause transmission ratios to change steplessly without the need for an engine output shaft of the vehicle to be connecting with any of the elements; and
a non-friction controllable brake assembly having a coupling state for coupling the fourth element to the transmission housing and an uncoupling state for uncoupling the fourth element from the transmission housing, the brake assembly being non-hydraulically controlled to change state to maintain a desired transmission ratio.

2. The system as claimed in claim 1 wherein the first, second, third and fourth elements comprise a first sun gear, at least one ring gear, at least one carrier and a second sun gear, respectively.

3. The system as claimed in claim 2 wherein the at least one ring gear includes a pair of interconnected distinct ring gears.

4. The system as claimed in claim 3 wherein the at least one carrier includes interconnected carriers.

5. The system as claimed in claim 1 wherein the transmission is an automatic transmission.

6. The system as claimed in claim 1 wherein the transmission is a multi-speed, step ratio transmission having a CVT mode for automotive vehicles.

7. The system as claimed in claim 1 wherein the gear set is a planetary gear set.

8. A vehicle drive system including a transmission, the system comprising:
a gear set including first, second, third and fourth elements, the second element connecting with an output shaft of the transmission;
a transmission housing;
a first electric motor having an output shaft connecting with the first element for driving the first element backwards in response to a first electrical signal;
a second electric motor having an output shaft connecting with the fourth element for driving the fourth element in response to a second electrical signal wherein the motors are actuatable to cause transmission ratios to change steplessly without the need for an engine output shaft of the vehicle to be connecting with any of the elements; and
a non-friction controllable brake assembly having a coupling state for coupling the third element to the transmission housing and an uncoupling state for uncoupling the third element from the transmission housing, the brake assembly being non-hydraulically controlled to change state to maintain a desired transmission.

9. The system as claimed in claim 8 wherein the first, second, third and fourth elements comprise a first sun gear, at least one ring gear, at least one carrier and a second sun gear, respectively.

10. The system as claimed in claim 8 wherein the transmission is an automatic transmission.

11. The system as claimed in claim 8 wherein the transmission is a multi-speed, step ratio transmission having a CVT mode for automotive vehicles.

12. The system as claimed in claim 8 wherein the gear set is a planetary gear set.

13. A vehicle drive system including a transmission, the system comprising:
a gear set including first, second, third and fourth elements, the second element connecting with an output shaft of the transmission;
a transmission housing;
a first electric motor having an output shaft connecting with the first element for driving the first element in response to a first electrical signal;
a second electric motor having an output shaft connecting with the fourth element for driving the fourth element in response to a second electrical signal wherein the motors are actuatable to cause transmission ratios to change steplessly without the need for an engine output shaft of the vehicle to be connecting with any of the elements; and non-friction controllable first and second brake assemblies, the first brake assembly having a coupling state for coupling the fourth element to the transmission housing and an uncoupling state for uncoupling the fourth element from the transmission housing, the second brake assembly having a coupling state for coupling the third element to the transmission housing and an uncoupling state for uncoupling the third element carrier from the transmission housing, the first and second brake assemblies being non-hydraulically controlled to change state to maintain a desired transmission ratio.

14. The system as claimed in claim 13 wherein the first, second, third and fourth elements comprise a first sun gear, at least one ring gear, at least one carrier and a second sun gear, respectively.

15. The system as claimed in claim 13 wherein the transmission is an automatic transmission.

16. The system as claimed in claim 13 wherein the transmission is a multi-speed, step ratio transmission having a CVT mode for automotive vehicles.

17. The system as claimed in claim 13 wherein the gear set is a planetary gear set.

* * * * *